US012758963B2

(12) United States Patent
Nielsen et al.

(10) Patent No.: US 12,758,963 B2
(45) Date of Patent: Oct. 13, 2026

(54) CONTROL OF CELL CONCENTRATION

(71) Applicant: HEWLETT-PACKARD DEVELOPMENT COMPANY, L.P., Spring, TX (US)

(72) Inventors: Jeffrey A. Nielsen, Corvallis, OR (US); Debora Thomas, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 889 days.

(21) Appl. No.: 17/608,091

(22) PCT Filed: Jul. 26, 2019

(86) PCT No.: PCT/US2019/043599
§ 371 (c)(1),
(2) Date: Nov. 1, 2021

(87) PCT Pub. No.: WO2021/021071
PCT Pub. Date: Feb. 4, 2021

(65) Prior Publication Data
US 2022/0314212 A1 Oct. 6, 2022

(51) Int. Cl.
*B01L 3/02* (2006.01)
*B01L 3/00* (2006.01)
(Continued)

(52) U.S. Cl.
CPC ....... *B01L 3/0268* (2013.01); *B01L 3/502761* (2013.01); *G01N 15/1031* (2013.01);
(Continued)

(58) Field of Classification Search
CPC ............ B01L 3/0268; B01L 3/502761; B01L 2200/0652; B01L 2200/143;
(Continued)

(56) References Cited

U.S. PATENT DOCUMENTS

| | | |
|---|---|---|
| 1,772,492 A | 8/1930 | Lake |
| 9,134,221 B2 | 9/2015 | Lo et al. |

(Continued)

FOREIGN PATENT DOCUMENTS

| | | |
|---|---|---|
| CN | 103923825 B | 1/2016 |
| EP | 1336097 A2 | 8/2003 |

(Continued)

*Primary Examiner* — Dean Kwak
(74) *Attorney, Agent, or Firm* — Foley & Lardner LLP

(57) ABSTRACT

An apparatus including a fluidic input and a die including a microfluidic chamber, may receive a biologic sample. The microfluidic chamber may include a foyer to contain a portion of the biologic sample, and an inlet impedance-based sensor to detect passage of a cell of the biologic sample into the foyer. A target nozzle may eject a first volume, corresponding with a target concentration of cells of the biologic sample. A spittoon nozzle may eject a second volume of the portion of the biologic sample into a spittoon location. An output impedance-based sensor may be disposed within a threshold distance of the target nozzle to detect passage of a cell of the biologic sample into the target nozzle. Moreover, the apparatus may include circuitry to control firing of the target nozzle and the spittoon nozzle based on signals received from the inlet impedance-based sensor and the output impedance-based sensor.

6 Claims, 5 Drawing Sheets

(51) Int. Cl.

| | |
|---|---|
| ***G01N 15/01*** | (2024.01) |
| ***G01N 15/02*** | (2024.01) |
| ***G01N 15/1031*** | (2024.01) |

(52) U.S. Cl.

CPC . *B01L 2200/0652* (2013.01); *B01L 2200/143* (2013.01); *B01L 2300/0816* (2013.01); *B01L 2300/0864* (2013.01); *G01N 15/01* (2024.01); *G01N 2015/0288* (2013.01)

(58) Field of Classification Search

CPC ..... B01L 2300/0816; B01L 2300/0864; B01L 2300/0627; B01L 2400/0439; G01N 2015/0288; G01N 15/1031; G01N 15/01; G01N 2015/1006; G01N 2015/1024; G01N 15/0266; G01N 2015/1028; G01N 2015/1029; G01N 15/0656; G01N 27/02; G01N 33/48728; G01N 33/5438; G01N 33/54373; G01N 1/28; G01N 15/1484

See application file for complete search history.

(56) References Cited

U.S. PATENT DOCUMENTS

| | | | | |
|---|---|---|---|---|
| 9,156,037 | B2 | 10/2015 | Yung et al. | |
| 2006/0144707 | A1 | 7/2006 | Landers et al. | |
| 2008/0286751 | A1 | 11/2008 | Renaud et al. | |
| 2012/0184010 | A1 | 7/2012 | Medoro et al. | |
| 2013/0095469 | A1 | 4/2013 | Koltay et al. | |
| 2018/0003611 | A1 | 1/2018 | Sells et al. | |
| 2018/0015460 | A1 * | 1/2018 | Sells | B01L 3/50273 |
| 2019/0151849 | A1 | 5/2019 | Nielsen et al. | |

FOREIGN PATENT DOCUMENTS

| | | | | |
|---|---|---|---|---|
| WO | WO-2016122559 | A1 | 8/2016 | |
| WO | WO-2018194610 | A1 * | 10/2018 | B01L 3/502707 |
| WO | WO-2018234590 | A1 | 12/2018 | |
| WO | WO-2019074521 | | 4/2019 | |

* cited by examiner

CONTROL OF CELL CONCENTRATION

CROSS-REFERENCE TO RELATED APPLICATIONS

This Utility Patent Application is a U.S. National Stage filing under 35 U.S.C. § 371 of PCT/US2019/043599, filed 26 Jul. 2019, incorporated by reference herein.

BACKGROUND

Microfluidic systems enable fluid-based experiments to be conducted using much smaller quantities of fluid as compared to microtiter plate-based experiments. These small volumes enable advantages such as a reduction in expensive chemicals used, a reduction in the amount of patient sample needed which makes sample collection easier and less intrusive, a reduction in the amount of waste generated, and in some cases a reduction in the time for processing.

BRIEF DESCRIPTION OF FIGURES

Various examples may be more completely understood in consideration of the following detailed description in connection with the accompanying drawings, in which.

Figure 1:
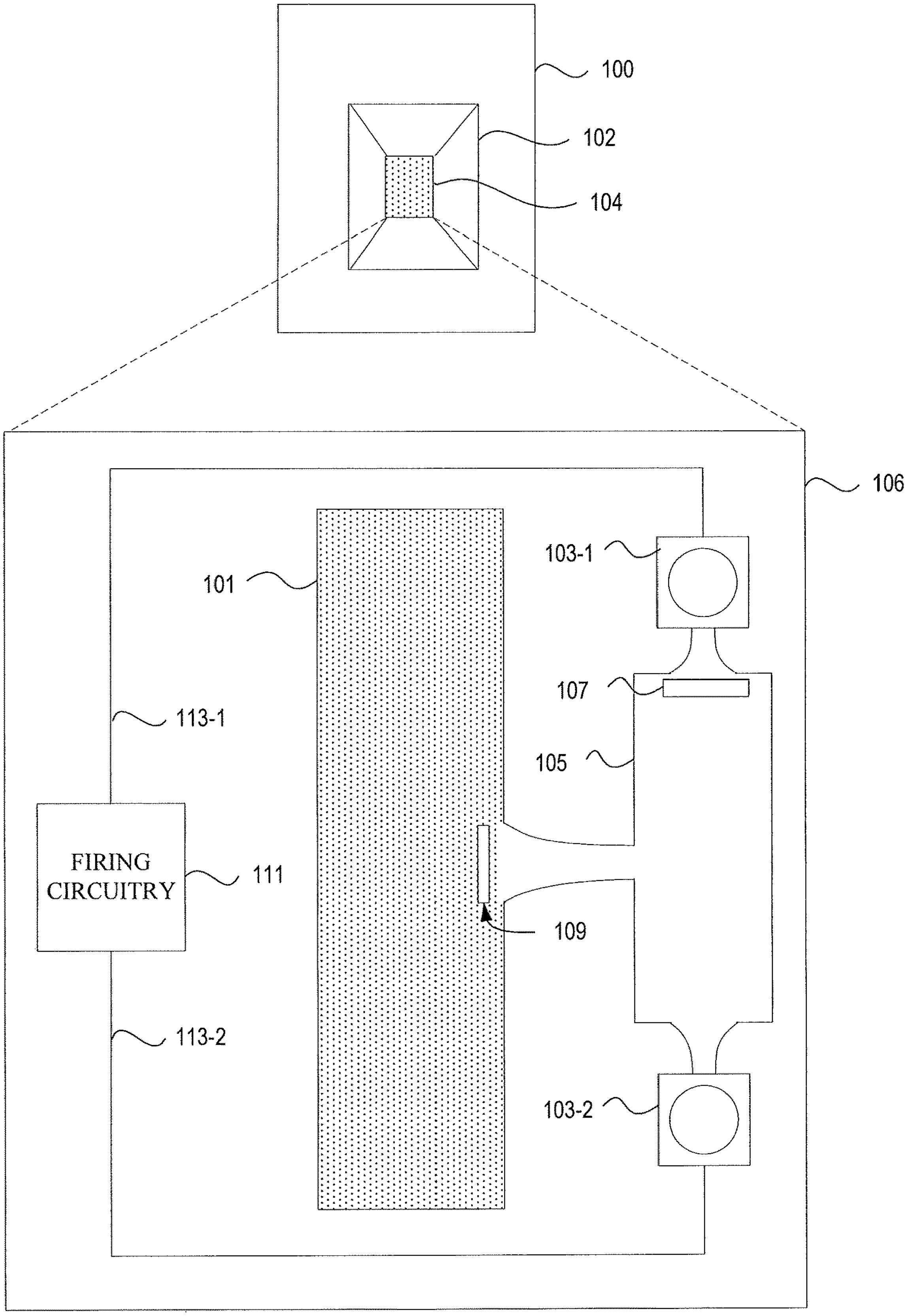
FIG. 1 is a diagram illustrating an example apparatus for control of cell concentration, in accordance with the present disclosure.

While various examples discussed herein are amenable to modifications and alternative forms, aspects thereof have been shown by way of example in the drawings and will be described in detail. It should be understood, however, that the intention is not to limit the disclosure to the particular examples described. On the contrary, the intention is to cover all modifications, equivalents, and alternatives falling within the scope of the disclosure including aspects defined in the claims. In addition, the term "example" as used throughout this application is by way of illustration, and not limitation.

DETAILED DESCRIPTION

The life sciences research and diagnostics industries are under pressure to reduce costs, increase throughput, and improve the utilization of patient samples. As a result, the instruments and tools used therein are moving from complex macrofluidic-based systems to simpler microfluidic-based technology, moving from pipetting-based technology to dispensing-based technology, and moving from performing a single test per sample to performing multiplexed tests per sample.

Inkjet-based systems can start with microliters of fluid and then dispense picoliters or nanoliters of fluid into specific locations on a substrate. These dispense locations can be either specific target locations on the substrate surface or can be cavities, microwells, channels, or indentations into the substrate. As used herein, a microwell refers to or includes a column capable of storing a volume of fluid between a nanoliter and several milliliters of fluid. There may be tens, hundreds, or even thousands of dispense locations on the substrate, which may represent many tests on a small number of samples, a small number of tests on many samples, or a combination of the two. Additionally, multiple dispensing nozzles or print heads may dispense fluid on the substrate at a time to enable a high-throughput design.

To reduce the size of assay systems, it may be beneficial to use microfluidic systems, including inkjet-based systems, to dispense test sample as well as test solutions such as reagents using the microfluidic system. To do so, it may further be beneficial to control a concentration of the test sample, including a number of cells as the case may be, in the test sample. Examples of the present disclosure may allow for a known concentration of cells to be achieved for assay measurement in a microfluidic system.

In accordance with the present disclosure, an apparatus including a fluidic input and a die including a microfluidic chamber, may receive a biologic sample. The microfluidic chamber may include a foyer to contain a portion of the biologic sample, and an inlet impedance-based sensor to detect passage of a cell of the biologic sample into the foyer. The microfluidic chamber may further include a target nozzle to eject a first volume of the portion of the biologic sample into a target location. The first volume may correspond with a target concentration of cells of the biologic sample. Additionally, the microfluidic chamber may include a spittoon nozzle to eject a second volume of the portion of the biologic sample into a spittoon location. An output impedance-based sensor may be disposed within a threshold distance of the target nozzle to detect passage of a cell of the biologic sample into the target nozzle. Moreover, the apparatus may include circuitry to control firing of the target nozzle and the spittoon nozzle based on signals received from the inlet impedance-based sensor and the output impedance-based sensor.

In some examples, an apparatus for control of cell concentration includes a die including a microfluidic chamber, and circuitry to control firing of the respective target nozzle. The microfluidic chamber may include a plurality of sense zones, where each sense zone detects a different respective type of cell within a biologic sample. Each respective sense zone may include a foyer to contain a portion of the biologic sample, and an inlet impedance-based sensor to detect passage of a cell of the biologic sample into the foyer. Additionally, each respective sense zone may include a target nozzle to eject a first volume of the portion of the biologic sample into a target location, the first volume corresponding with a target concentration of cells of the biologic sample. Each respective sense zone may include a first output impedance-based sensor disposed within a threshold distance of the target nozzle to detect passage of a cell of the biologic sample from the target nozzle. The circuitry may control firing of the respective target nozzle based on signals received from the associated inlet impedance-based sensor and the associated output impedance-based sensor.

In some examples, a non-transitory computer-readable medium may store instructions which, when executed by a processor, may cause the processor to control a microfluidic chamber for concentration of cells. For instance, the non-transitory computer-readable medium may store instructions that cause the processor to receive an indication of a target concentration of cells of a biologic sample to be dispensed in a target location. Additionally, the medium may store instructions that cause the processor to, responsive to receipt of a signal from an inlet impedance-based sensor of a foyer in a microfluidic chamber, indicating passage of a cell of the biologic sample into the foyer, fire a target nozzle in fluidic contact with the foyer or a spittoon nozzle in fluidic contact with the foyer to direct a flow of the detected cell to the target location or a spittoon location. Yet further, the medium may store instructions that cause the processor to, responsive to receipt of a signal from an outlet impedance-based sensor of the foyer, indicating passage of the cell out of the foyer, store an estimated cell concentration in the target location.

Turning now to the figures, FIG. 1 is a diagram illustrating an example apparatus 100 for control of cell concentration, in accordance with the present disclosure. In the example illustrated in FIG. 1, two dispensing nozzles are matched to two dispense locations. One dispensing nozzle is over a spittoon location and a second dispensing nozzle is over a target location, with these two nozzles located relatively far apart within a single microfluidic chamber. The nozzle over the spittoon location, the spittoon nozzle, may be operated until an inlet impedance sensor detects a cell, at which point, the operation may change from the spittoon nozzle to the nozzle over the target location, the target nozzle. When an outlet impedance sensor detects the cell passing out the second target nozzle, then operation may switch back to the spittoon nozzle. This process may be repeated to maximize concentration of dispensed cells.

A specific cell concentration can be achieved by diverting different ratios of cells and fluid between the target and spittoon nozzles. In other words, a cell concentration between the starting concentration and a maximum concentration can be achieved by diverting more of the dispensing to the target location and less away from the spittoon location. By diverting more of the non-cell-containing fluid into the target location, lower cell concentrations can be achieved. Similarly, a cell concentration of less than the starting concentration can be achieved by diverting some cell-containing drops to the spittoon, and some of the non-cell containing drops to the target. In the above embodiment, a cell concentration of zero can be achieved by diverting all of the cell-containing drops to the spittoon, and all of the non-cell containing drops to the target. Additionally, a cell concentration equal to the starting concentration can be achieved by using the target nozzle and not using the spittoon nozzle.

As illustrated, the apparatus 100 may include a fluidic input 102 and a die including a microfluidic chamber 106 that may receive a biologic sample. The fluidic input 102 may include an aperture 104 to receive the biologic sample. The exploded view illustrates a bottom side of the apparatus 100, opposite of the fluidic input 102. As an illustration, as the biologic sample is received in fluidic input 102, the sample flows into aperture 104. The biologic sample flows through the aperture 104 and onto the bottom side of apparatus 100, where the microfluidic chamber 106 is disposed.

The microfluidic chamber 106 may include a foyer 105 to contain a portion of the biologic sample, and an inlet impedance-based sensor 109 to detect passage of a cell of the biologic sample into the foyer 105. For instance, the biologic sample may flows from the aperture 104 to a reservoir 101 of the microfluidic chamber 106. As the biologic sample, including cells, flows from the reservoir 101 to the foyer 105, the inlet impedance-based sensor 109 may detect passage of a cell of the biologic sample into the foyer 105.

The microfluidic chamber 106 may further include a target nozzle 103-1 to eject a first volume of the portion of the biologic sample into a target location. As used herein, the target location refers to or includes a particular location to which a particular concentration of cells is to be dispensed. The target location may be a particular well on a microwell plate, a substrate, and/or other locations to which a sample may be dispensed. The first volume may correspond with a target concentration of cells of the biologic sample. Additionally, the microfluidic chamber 106 may include a spittoon nozzle 103-2 to eject a second volume of the portion of the biologic sample into a spittoon location. As used herein, the spittoon location refers to or includes a particular location to which waste material is to be dispensed. The waste material may be volumes of the biologic sample not including cells, and/or the waste material may be volumes of the biologic sample including cells that are not to be dispensed in the target location. The spittoon location may be a particular well on a microwell plate, a substrate, and/or other locations to which the waste material may be dispensed.

An output impedance-based sensor 107 may be disposed within a threshold distance of the target nozzle 103-1 to detect passage of a cell of the biologic sample into the target nozzle 103-1. As used herein, the threshold distance may be a distance close enough to the nozzle such that passage of a cell into the nozzle may be detected. An example range of the threshold distance of the output impedance-based sensor, as measured from an edge of the target nozzle, may be 5-100 um. The target nozzle 103-1 may include a fluid ejector, such as a thermal inkjet resistor, to eject the biologic sample onto the target location. As such, the apparatus 100 may include circuitry 111 to control firing of the target nozzle 103-1 and the spittoon nozzle 103-2 based on signals received from the inlet impedance-based sensor 109 and the output impedance-based sensor 107. For instance, if a cell passes from reservoir 101 into foyer 105, and the target concentration of cells has not been achieved yet at the target location, firing circuitry 111 may transmit a signal to target nozzle 103-1 to fire, thereby drawing the cell from foyer 105 through target nozzle 103-1. As the cell passes from foyer 105 to target nozzle 103-1, the output impedance-based sensor 107 may detect the presence of the cell, indicating that the concentration of the cells has increased as a result of the dispensed cell. As such, the circuitry. 111 may control firing of the target nozzle 103-1 responsive to a number of cells detected by the first output impedance-based sensor 107, and to concentrate cells of the biologic sample in the target location. Similarly, the circuitry 111 may control firing of the spittoon nozzle 103-2 responsive to a number of cells detected by the first output impedance-based sensor 107. For instance, once the target concentration of cells has been achieved at the target location, and/or if the cells are not of a particular size and/or type, the spittoon nozzle 103-2 may fire and dispense the sample into the spittoon location. Accordingly, the circuitry 111 may include electrical contacts 113-1 and 113-2, coupling circuitry 111 to the nozzles 103-1 and 103-2, respectively.

Although FIG. 1 illustrates a single foyer, with a single target nozzle 103-1 and a single spittoon nozzle 103-2, examples are not so limited. For instance, in some examples the microfluidic chamber 106 includes a plurality of target nozzles in fluidic contact with the same foyer 105, where each respective target nozzle has a different respective output impedance-based sensor disposed within a threshold distance of the target nozzle to detect passage of a cell into the respective target nozzle. As such, the biologic sample may be directed toward a plurality of different target nozzles by firing the respective target nozzle.

Additionally, although not illustrated in FIG. 1, in some examples, the microfluidic chamber does not contain an outlet impedance sensor. In such examples, once an inlet impedance-based sensor, such as sensor 109, has detected a cell, operation moves from the spittoon nozzle to the target nozzle and the target nozzle dispenses a certain number of drops that is at least equal to the volume of fluid contained within the foyer 101 such that there is a high probability that the cell has been ejected from the target nozzle. After this volume of fluid has been dispensed, operation may revert back to the spittoon nozzle and the operation may be repeated.

Additionally, a single dispense nozzle may be used in two dispense locations. For instance, rather than having a target nozzle 103-1 and a spittoon nozzle 103-2, a single dispensing nozzle may begin over a spittoon location and be operated until the inlet sensor 109 detects a cell, at which point the dispensing may stop and the nozzle may be moved to a target dispense location. Dispensing may resume until the outlet impedance-base sensor 107 detects the cell passing, at which point the dispensing may stop. This operation may switch back to the spittoon location and the process may be repeated for each cell to maximize concentration of dispensed cells.

Figure 2A:
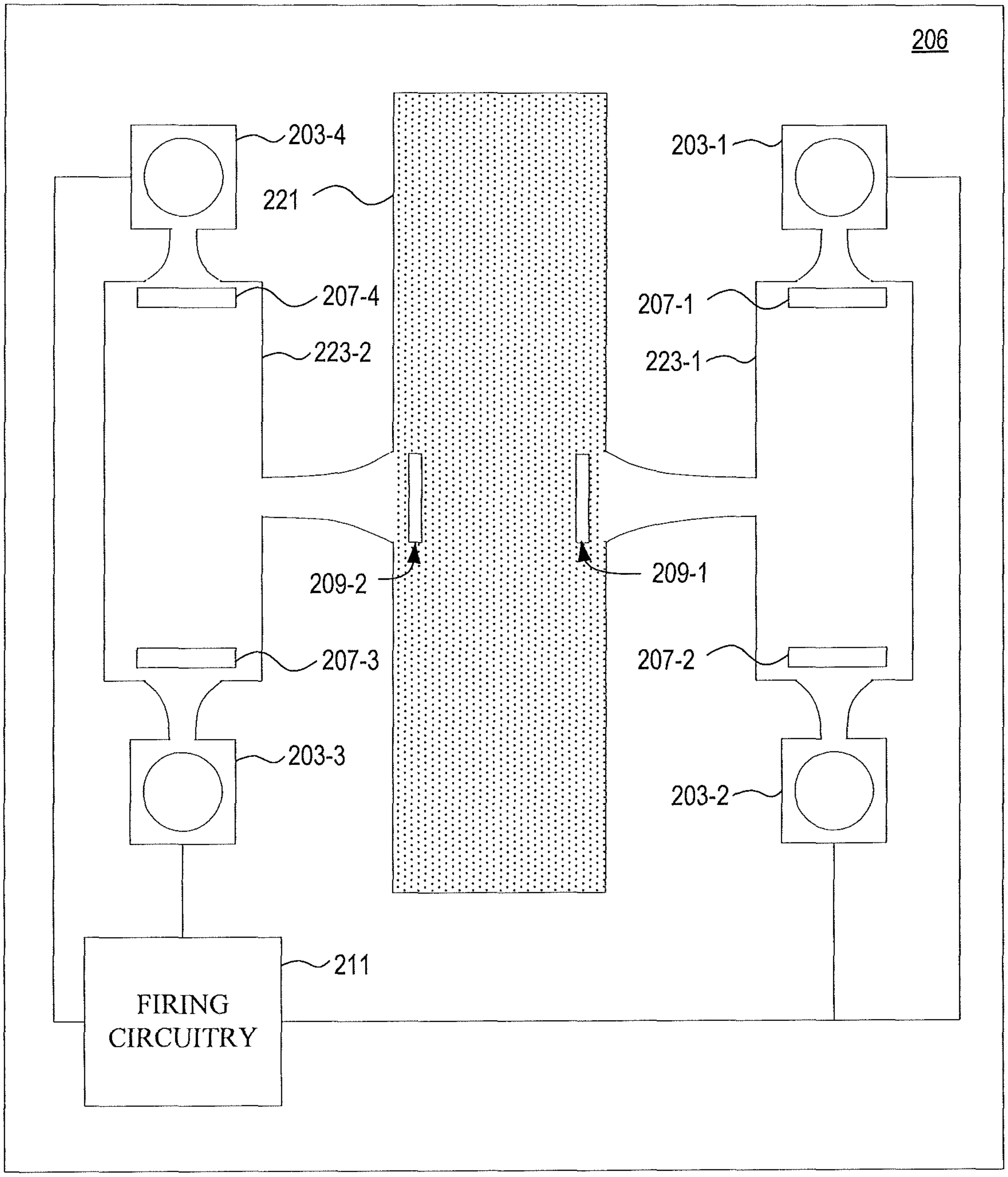
FIG. 2A is a diagram illustrating an example apparatus including multiple foyers for control of cell concentration, in accordance with the present disclosure.

FIG. 2A is a diagram illustrating an example apparatus including multiple foyers for control of cell concentration, in accordance with the present disclosure. In examples as illustrated in FIG. 2A, the spittoon and target locations may be within a high-density microtiter plate, such as a 1536 well plate, where the spacing between the target and spittoon nozzle match two target locations in two different wells without moving the substrate. These paths may be similar and redundant, with the redundancy used either to increase throughput or to increase system robustness. As discussed with regards to FIG. 1, the apparatus may include a die including a microfluidic chamber 206, and circuitry 211 to control firing of each respective target nozzle. For instance, the microfluidic chamber 206 may include a plurality of sense zones, where each sense zone detects a different respective type of cell within a biologic sample. Referring to FIG. 2, a first sense zone is illustrated on the right of reservoir 221, and includes a first target nozzle 203-1, a first spittoon nozzle 203-2, a first inlet impedance-based sensor 209-1, and outlet impedance-based sensors 207-1 and 207-2. Similarly, a second sense zone is illustrated on the left of reservoir 221, and includes a second target nozzle 203-4, a second spittoon nozzle 203-3, a second inlet impedance-based sensor 209-2, and outlet impedance-based sensors 207-3 and 207-4.

As illustrated in FIG. 2A, each respective sense zone includes a foyer to contain a portion of the biologic sample, and an inlet impedance-based sensor to detect passage of a cell of the biologic sample into the foyer. For instance, inlet impedance-based sensor 209-1 detects passage of cells into foyer 223-1, whereas inlet impedance-based sensor 209-2 detects passage of cells into foyer 223-2. Additionally, each respective sense zone may include a target nozzle to eject a first volume of the portion of the biologic sample into a target location, the first volume corresponding with a target concentration of cells of the biologic sample. As an example, a biologic sample may flow from reservoir 221 into foyer 223-2, and a cell or cells may be detected by inlet impedance-based sensor 209-2. Responsive to detecting the cell or cells by inlet impedance-based sensor 209-2, target nozzle 203-4 may eject a portion of the sample to dispense the cell or cells into the target location associated with nozzle 203-4.

Each respective sense zone may include a first output impedance-based sensor disposed within a threshold distance of the target nozzle to detect passage of a cell of the biologic sample from the target nozzle. Accordingly, the circuitry 211 may control firing of each respective target nozzle, based on signals received from the associated inlet impedance-based sensor and the associated output impedance-based sensor.

As illustrated in FIG. 2A, each respective sense zone may further include a spittoon nozzle to eject a second volume of the portion of the biologic sample into a spittoon location. In such examples, the second volume may include a waste volume, or volume of the biologic sample that is not to be added to the target location. As such, the circuitry 211 may control firing of each respective spittoon nozzle based on the signals received from the associated inlet impedance-based sensor and the associated output impedance-based sensor.

Figure 2B:
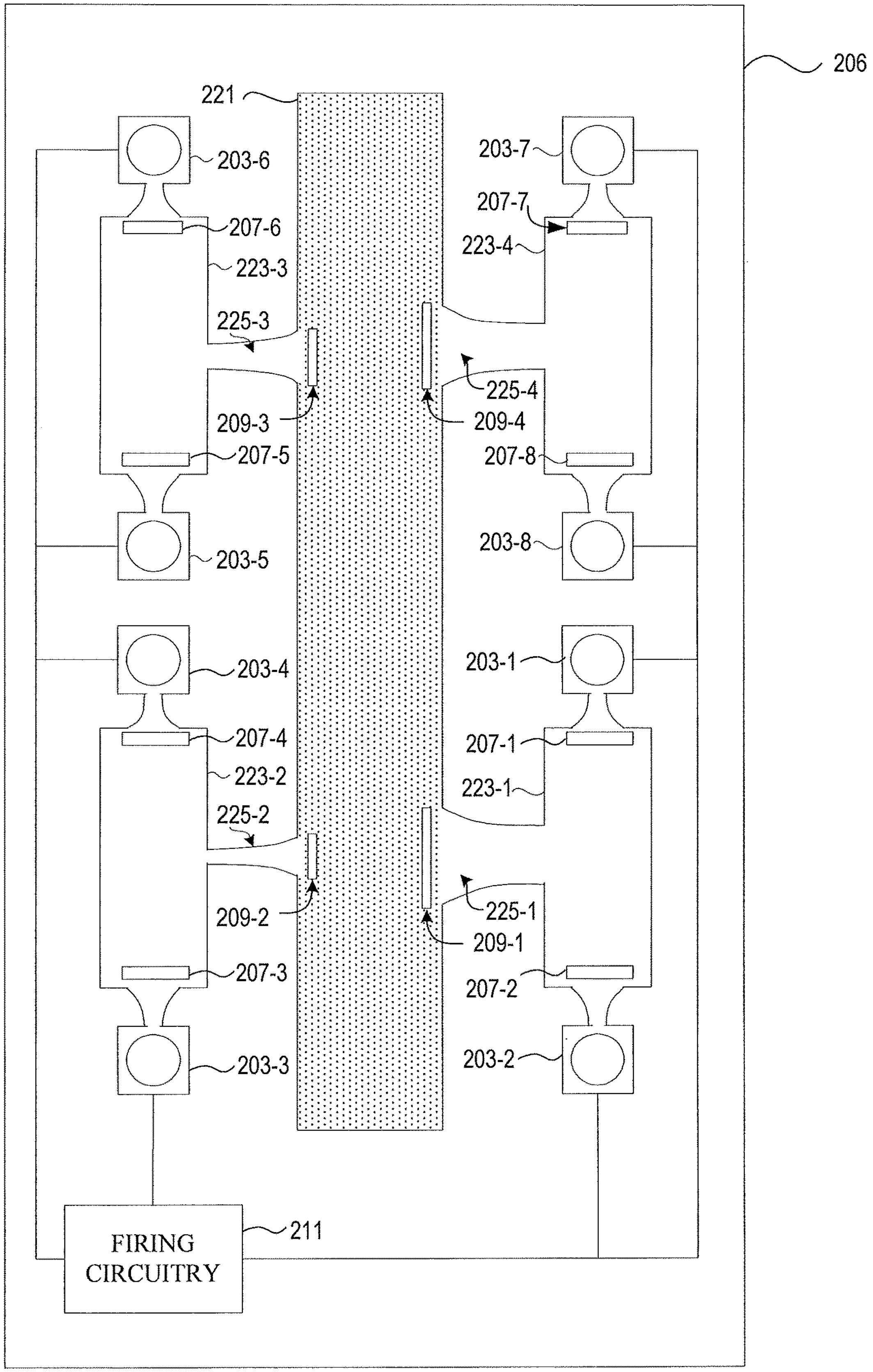
FIG. 2B is a diagram illustrating an example apparatus including multiple foyers having different input channel widths, in accordance with the present disclosure.

FIG. 2B is a diagram illustrating an example apparatus including multiple foyers having different input channel widths, in accordance with the present disclosure. In various examples, the maximum concentration achievable may be based on the geometry of the input channel. For instance, these input channels may be unique, with each input channel modified for specific fluid properties, such as average cell size, i.e. a larger input channel width may be used for larger cells. Such examples allow a single die design to be used for various input fluids. Such examples also allow sorting of multiple cell types and/or sizes from a single mixed sample by diverting cells of one type, based on size, impedance, or other measurable property, to the target nozzle and cells of another type, based on size, impedance, or other measurable property to the spittoon nozzle.

As illustrated in FIG. 2B, the microfluidic chamber 206 may include a plurality of foyers 223-1, 223-3, 223-3, and 223-4, each coupled to a common reservoir 221. Each respective foyer may be coupled to the reservoir by a different respective input channel. For instance, foyer 223-1 may be coupled to reservoir 221 by input channel 225-1 with a 20 micrometer (um) input channel width, whereas foyer 223-2 may be coupled to reservoir 221 by input channel 225-2 with a 12 um input channel width. Similarly, foyer 223-3 may be coupled to reservoir 221 by input channel 225-3 with a 14 um input channel width, and foyer 223-4 may be coupled to reservoir 221 by input channel 225-4 with a 16 um input channel width. As such, each respective input channel may have a different width, and therefore permit passage of different sized cells into the respective foyer. Moreover, the circuitry 211 may control firing of the various nozzles to obtain target concentrations of cells in different locations. For instance, circuitry 211 may fire target nozzle 203-7 to dispense cells into a target location associated with target nozzle 203-7, and fire target nozzle 203-6 to dispense cells into a target location associated with target nozzle 203-6.

Each of the respective target nozzles may have a different respective target concentration. For instance, target nozzle 203-1 may be associated with a first target concentration of cells, target nozzle 203-4 may be associated with a second target concentration of cells, target nozzle 203-6 may be associated with a third target concentration of cells, and target nozzle 203-7 may be associated with a fourth target concentration of cells.

Figure 2C:
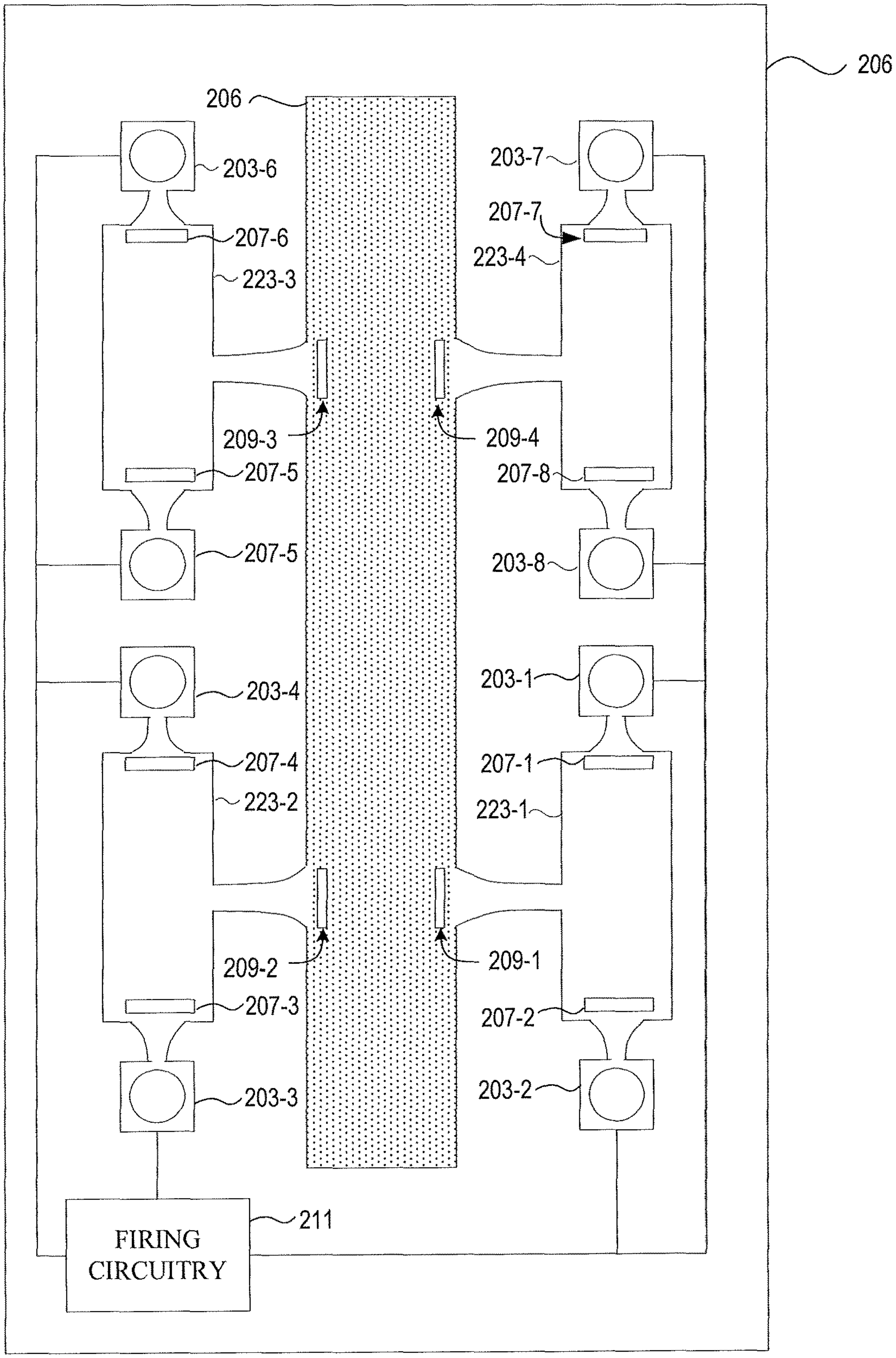
FIG. 2C is a diagram illustrating an example apparatus including multiple foyers for different impedance measurements, in accordance with the present disclosure.

FIG. 2C is a diagram illustrating an example apparatus including multiple foyers for different impedance measurements, in accordance with the present disclosure. In some examples, each sense zone may concentrate cells having different impedance measurements. For instance, a first target nozzle, such as 103-1, may eject a volume of the biologic sample into a first target location. This volume ejected by target nozzle 203-1 may include cells that, when they passed inlet impedance-based sensor 209-1, were associated with impedance measurements within a first range. Similarly, the volume ejected by target nozzle 203-4 may include cells that, when they passed inlet impedance-based sensor 209-2, were associated with impedance measurements within a second range. The volume ejected by target nozzle 203-6 may include cells that, when they passed inlet impedance-based sensor 209-3, were associated with impedance measurements within a third range, and the volume ejected by target nozzle 203-7 may include cells that, when they passed inlet impedance-based sensor 209-4, were associated with impedance measurements within a fourth range. For instance, the volume ejected by target nozzle 203-1 may include cells that were associated with impedance measurements from 50-70 millivolts (mV). The volume ejected by target nozzle 203-2 may include cells that were associated with impedance measurements from 100-120 mV. The volume ejected by target nozzle 203-6 may include cells that were associated with impedance measurements from 150-170 mV. The volume ejected by target nozzle 203-7 may include cells that were associated with impedance measurements from 210-250 mV. Examples are not so limited, however, and the measured impedance ranges may include various ranges between 1-500 mV.

Figure 3:
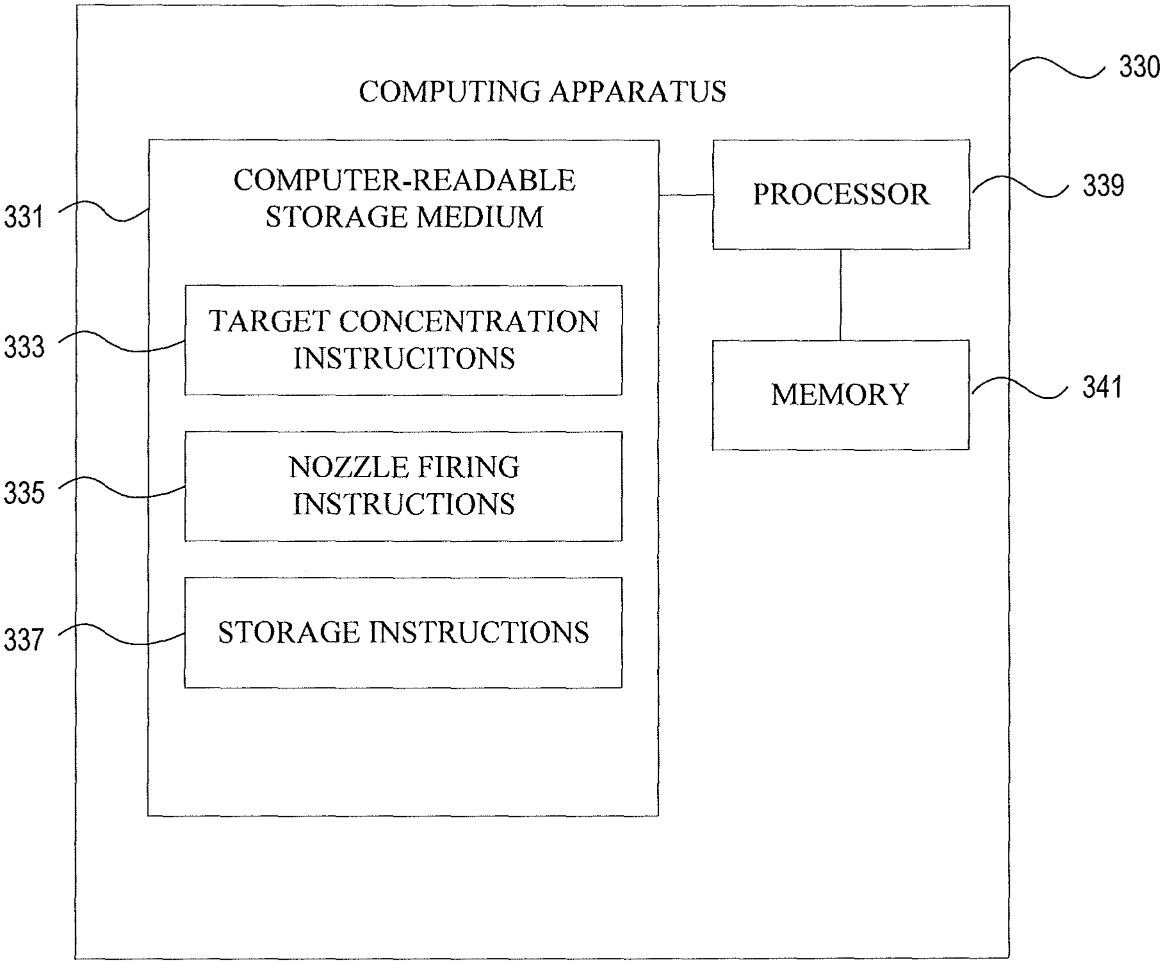
FIG. 3 is a diagram illustrating an example computing apparatus for control of cell concentration, in accordance with the present disclosure.

FIG. 3 is a diagram illustrating an example computing apparatus 330 for control of concentration of cells, in accordance with the present disclosure. In the example of FIG. 3, the computing apparatus 330 may include a processor 339 and a non-transitory computer-readable storage medium 331, and a memory 341. The non-transitory computer-readable storage medium 331 further includes instructions 333, 335, and 337 for control of cell concentration. The computing apparatus 330 may be, for example, a printer, a mobile device, multimedia device, a secure microprocessor, a notebook computer, a desktop computer, an all-in-one system, a server, a network device, a controller, a wireless device, or any other type of device capable of executing the instructions 333, 335, and 337. In certain examples, the computing apparatus 330 may include or be connected to additional components such as memory, controllers, etc.

The processor 339 may be a central processing unit (CPU), a semiconductor-based microprocessor, a graphics processing unit (GPU), a microcontroller, special purpose logic hardware controlled by microcode or other hardware devices suitable for retrieval and execution of instructions stored in the non-transitory computer-readable storage medium 331, or combinations thereof. The processor 339 may fetch, decode, and execute instructions 333, 335, and 337 to control cell concentration, as discussed with regards to FIGS. 1, 2A, 2B, and 2C. As an alternative or in addition to retrieving and executing instructions, the processor 339 may include at least one integrated circuit (IC), other control logic, other electronic circuits, or combinations thereof that include a number of electronic components for performing the functionality of instructions 333, 335, and 337.

Non-transitory computer-readable storage medium 331 may be an electronic, magnetic, optical, or other physical storage device that contains or stores executable instructions. Thus, non-transitory computer-readable storage medium 331 may be, for example, Random Access Memory (RAM), an Electrically Erasable Programmable Read-Only Memory (EEPROM), a storage device, an optical disc, etc. In some examples, the computer-readable storage medium 331 may be a non-transitory storage medium, where the term 'non-transitory' does not encompass transitory propagating signals. As described in detail below, the non-transitory computer-readable storage medium 331 may be encoded with a series of executable instructions 333, 335, and 337. In some examples, non-transitory computer-readable storage medium 331 may implement a memory 341 to store and/or execute instructions 333, 335, and 337. Memory 341 may be any non-volatile memory, such as EEPROM, flash memory, etc.

In various examples, the non-transitory computer-readable storage medium 331 may store instructions 333, 335, and 337 which, when executed by a processor 339, may cause the processor 339 to control a microfluidic chamber for concentration of cells. For instance, the non-transitory computer-readable medium 331 may store target concentration instructions 333 that cause the processor 339 to receive an indication of a target concentration of cells of a biologic sample to be dispensed in a target location.

Additionally, the medium 331 may store nozzle firing instructions 335 that cause the processor 339 to, responsive to receipt of a signal from an inlet impedance-based sensor of a foyer in a microfluidic chamber, indicating passage of a cell of the biologic sample into the foyer, fire a target nozzle in fluidic contact with the foyer or a spittoon nozzle in fluidic contact with the foyer to direct a flow of the detected cell to the target location or a spittoon location.

Yet further, the medium 331 may include storage instructions that cause the processor 339 to, responsive to receipt of a signal from an outlet impedance-based sensor of the foyer, indicating passage of the cell out of the foyer, store an estimated cell concentration in the target location. In some examples, the medium 331 may include instructions to adjust a flow of the biologic sample to the target nozzle or the spittoon nozzle, until the target concentration of cells of the biologic sample is dispensed in the target location. Additionally, the medium 331 may include instructions to receive an indication of a size of cells of the biologic sample to be dispensed in the target location, and responsive to receipt of a signal from the inlet impedance-based sensor indicative of the size of a cell of the biologic sample which passed into the foyer, fire the target nozzle or the spittoon nozzle to direct the detected cell to the target location or a spittoon location.

Terms to exemplify orientation, such as left/right, and top/bottom, may be used herein to refer to relative positions of elements as shown in the figures. It should be understood that the terminology is used for notational convenience and that in actual use the disclosed structures may be oriented different from the orientation shown in the figures. Thus, the terms should not be construed in a limiting manner.

Various terminology as used in the Specification, including the claims, connote a plain meaning in the art unless otherwise indicated. As examples, the Specification describes and/or illustrates aspects useful for implementing the claimed disclosure by way of various structure, such as circuits or circuitry selected or designed to carry out specific acts or functions, as may be recognized in the figures or the related discussion as depicted by or using terms such as blocks, device, and system, and/or other examples. It will also be appreciated that certain of these blocks may also be used in combination to exemplify how operational aspects have been designed and/or arranged. Whether alone or in combination with other such blocks or circuitry including discrete circuit elements such as transistors, resistors, these above-characterized blocks may be circuits coded by fixed design and/or by configurable circuitry and/or circuit elements for carrying out such operational aspects. In certain examples, such a programmable circuit refers to or includes computer circuits, including memory circuitry for storing and accessing a set of program code to be accessed/executed as instructions and/or configuration data to perform the related operation. Depending on the data-processing application, such instructions and/or data may be for implementation in logic circuitry, with the instructions as may be stored in and accessible from a memory circuit. Such instructions may be stored in and accessible from a memory via a fixed circuitry, a limited group of configuration code, or instructions characterized by way of object code.

Where the Specification may make reference to a "first [type of structure]", a "second [type of structure]", etc., the adjectives "first" and "second" are not used to connote any description of the structure or to provide any substantive meaning; rather, such adjectives are merely used for English-language antecedence to differentiate one such similarly-named structure from another similarly-named structure designed or coded to perform or carry out the operation associated with the structure.

The term "sample," as used herein, generally refers to any biological material, either naturally occurring or scientifically engineered mixtures. Examples of naturally-occurring samples or mixtures include, but are not limited to, whole blood, blood plasma, and other body fluids, as well as tissue cell cultures obtained from humans, plants, or animals. Examples of scientifically-engineered samples or mixtures include; but are not limited to, lysates, nucleic acid samples eluted from agarose and/or polyacrylamide gels, solutions containing multiple species of molecules resulting either from nucleic acid amplification methods, such as PCR amplification or reverse transcription polymerase chain reaction (RT-PCR) amplification, or from RNA or DNA size selection procedures, and solutions resulting from post-sequencing reactions. However, the sample will generally be a biological sample, which may contain any viral or cellular material, including all prokaryotic or eukaryotic cells, viruses, bacteriophages, mycoplasmas, protoplasts, and organelles. Such biological material may thus comprise all types of mammalian and non-mammalian animal cells, plant cells, algae including blue-green algae, fungi, bacteria, protozoa, etc. Representative samples thus include whole blood and blood-derived products such as plasma, serum and buffy coat, urine, feces, cerebrospinal fluid or any other body fluids, tissues, cell cultures, cell suspensions, etc.

Various modifications and changes may be made to the above description without strictly following the examples and applications illustrated and described herein. For example, methods as exemplified in the Figures may involve processes carried out in various orders, with other aspects of the examples herein retained, or may involve fewer or more processes. Such modifications do not depart from the true spirit and scope of various aspects of the disclosure, including aspects set forth in the claims.

What is claimed is:

1. An apparatus for controlling a cell concentration of a biologic sample, comprising:

a fluidic input to receive the biologic sample containing cells;

a die including a microfluidic chamber, wherein the microfluidic chamber includes:

a foyer in fluidic contact with a reservoir containing the biological sample, the foyer having a defined chamber structure configured to contain a portion of the biologic sample;

an inlet impedance-based sensor having a pair of electrodes positioned proximate the foyer and the reservoir and configured to detect passage of a cell of the biologic sample into the foyer;

a target nozzle having a defined aperture in fluidic contact with the foyer and configured to eject a first volume of the portion of the biologic sample into a target location, the first volume corresponding with a target concentration of cells of the biologic sample;

a spittoon nozzle having a defined aperture in fluidic contact with the foyer and configured to eject a second volume of the portion of the biologic sample into a spittoon location; and a first output impedance-based sensor having a pair of electrodes positioned proximate the foyer, disposed within a threshold distance of 5-100 micrometers of the target nozzle, and configured to detect passage of a cell of the biologic sample into the target nozzle; and circuitry comprising a processor and a non-transitory computer-readable medium storing instructions thereon that, when executed by the processor, cause the processor to:

responsive to detecting passage of a cell into the foyer by the inlet impedance-based sensor, switch from firing the spittoon nozzle to firing the target nozzle to draw the cell from the foyer through the target nozzle; and responsive to detecting passage of the cell into the target nozzle by the first output impedance-based sensor, switch from firing the target nozzle to firing the spittoon nozzle, to selectively concentrate the cells of the biologic sample in the target location.

2. The apparatus of claim 1, the die further including the reservoir in fluidic contact with the fluidic input, wherein the inlet impedance-based sensor detects passage of the cell into the foyer from the reservoir.

3. The apparatus of claim 1, further including a second output impedance-based sensor disposed within a threshold distance of the spittoon nozzle to detect passage of a cell of the biologic sample from the spittoon nozzle.

4. The apparatus of claim 1, wherein the circuitry is to control firing of the target nozzle responsive to a number of cells detected by the first output impedance based sensor.

5. The apparatus of claim 1, wherein the circuitry is to control firing of the spittoon nozzle responsive to a number of cells detected by the first output impedance-based sensor.

6. The apparatus of claim 1, wherein the microfluidic chamber includes a plurality of target nozzles in fluidic contact with the foyer, and each respective target nozzle has a different respective output impedance-based sensor disposed within a threshold distance of the respective target nozzle to detect passage of a cell into the respective target nozzle.

* * * * *